US006023602A

United States Patent [19]

Kitajima et al.

[11] Patent Number: 6,023,602

[45] Date of Patent: Feb. 8, 2000

[54] COAXIAL REPEATER

[75] Inventors: Yasuhiro Kitajima; Kouichi Kawada, both of Tokyo, Japan

[73] Assignee: NEC Corporation, Tokyo, Japan

[21] Appl. No.: 09/032,291

[22] Filed: Feb. 27, 1998

[30] Foreign Application Priority Data

Mar. 12, 1997 [JP] Japan .................................... 9-056771

[51] Int. Cl.[7] ................................ H04Q 7/20; H04B 1/38

[52] U.S. Cl. ........................... 455/3.1; 455/11.1; 455/3.1; 455/6.3; 455/561; 455/90; 455/347; 455/351; 455/560; 348/6; 348/13

[58] Field of Search ..................................... 455/11.1, 3.1, 455/3.2, 3.3, 6.1, 6.3, 90, 575, 347, 351, 561, 560; 348/6–13; 370/315

[56] References Cited

FOREIGN PATENT DOCUMENTS

H5-81955 11/1993 Japan .
H5-85095 11/1993 Japan .
8-130066 5/1996 Japan .
H9-17521 1/1997 Japan .

*Primary Examiner*—Dwayne D. Bost
*Assistant Examiner*—Linwood C. Scott, Jr.
*Attorney, Agent, or Firm*—Scully, Scott, Murphy & Presser

[57] ABSTRACT

A coaxial repeater of the present invention includes a connector having an L shaped metal piece 1 and an insulating casing 2. The connector is mounted in an introducing hole **3*a*-1 provided in a casing 3. A connecting portion 8*a* of an amplifier portion 8 is electrically connected to one of protrusions of the connector and a center conductor 4*a*-1 of an adapter 4-1 is fitted in and electrically connected to the other protrusion of the connector. The introducing hole 3*a*-1 becomes a space 3*g*-1 when the adapter 4*a*-1 and the amplifier portion 8 are mounted. The space 3*g*-1 is shielded from a receiving space 3*b* of the casing 3**. With the coaxial repeater constructed as mentioned above, it is possible to improve electrical characteristics of a device operating in a high frequency band, facilitate the maintenance thereof, reduce the number of parts thereof and reduce the cost of parts.

8 Claims, 9 Drawing Sheets

COAXIAL REPEATER

BACKGROUND OF THE INVENTION

The present invention relates to a coaxial repeater and, particularly, to a connector structure of a repeater portion for relaying an external signal input through a coaxial cable in a CATV (Cable Television) system to an internal electronic device.

In the CATV system, an input/output portion of a device using a coaxial cable usually has a structure in which a signal input from an external connection adapter called FT (Field Through) adapter fixed to a casing of the device is output from a connector or a block provided on a PWB (Printed Writing Board) through the PWB to an electronic device (amplifier portion) inside the device.

Such structure of the input/output portion may be realized by transmitting a signal by fitting or soldering a center conductor of an adapter mounted on the casing to a connecting metal hardware mounted on a printed circuit board, as to be described later. Alternatively, the structure may be realized by passing a center conductor of an adapter mounted on the casing through a connecting block mounted on a printed circuit board and connecting the center conductor to the block by vertically pressing the block to the center conductor by screws.

Japanese Utility Model Application Laid-open Nos. H5-81955 and H5-85095 and Japanese Patent Application Laid-open No. H9-17521 disclose other structures than those mentioned above.

When the above mentioned conventional connecting structure of the input/output portion, in which the center conductor of the adapter is fixed to the block by the screws or connected in point contact to the block by the connecting metal hardware of such as resilient material, is used in a CATV coaxial repeater operable in a high frequency range (not lower than 450 MHz), it becomes difficult to maintain electric characteristics (grounding characteristics, return loss and undesired radiation, etc.) due to small contact portion and, therefore, a special consideration (for example, a provision of a shield plate and/or a spring for making the grounding reliable) for maintaining the electrical characteristics is required, which causes an assembling to be complicated and a cost to be increased.

When the center conductor of the adapter is connected to the block or the connector and then to the internal electronic device through the printed circuit board, the signal is transmitted to the electronic device through a plurality of connecting portions. Therefore, there may be a signal loss (return loss, grounding potential) between the connecting portions. In such case, the signal flowing between the printed boards is influenced by undesired radiation produced within the device and noise may be introduced to the signal, leading to a degradation of the electrical characteristics of the device.

SUMMARY OF THE INVENTION

An object of the present invention is to provide a coaxial repeater which can improve the electrical characteristics of a device operating in a high frequency band, facilitate the maintenance of the repeater, reduce the number of parts and reduce the cost of the parts.

A coaxial repeater according to the present invention includes an amplifier for amplifying an external signal input thereto through a coaxial cable and supplying the amplifier signal to an internal circuit. An adapter includes a center conductor which is fitted with a connecting portion of the coaxial cable and electrically connected to the connecting portion of the coaxial cable. A connector includes a first connecting piece which holds the center conductor and is electrically connected to the center conductor and a second connecting piece which is electrically connected to a connecting portion of the amplifier. The first and second connecting pieces form an L shaped structure. A casing of the repeater includes a receiving space for receiving the amplifier, another space which is shielded from the receiving space and receives the connector when the amplifier and the adapter are mounted and a door covering an opening portion of the casing. The adapter and the amplifier are detachably connected to the connector.

In another aspect of the coaxial repeater according to the present invention, the connector includes an insulating casing member for holding the first and second connecting pieces in the another space and fixed in the another space.

The coaxial repeater according to the present invention can remove some causes of degradation of signal received from the adapter in a path up to the amplifier and transmit the signal to the amplifier while maintaining the signal quality very close to that of the received signal. As a result, it becomes possible to improve the performance of the device, that is, to realize a stable transmission and receiving a signal, a transmission of a large amount of information by expanding a transmission frequency band and a reduction of signal loss and restriction of signal degradation, etc. With such coaxial repeater, the construction thereof becomes simple and the reduction of the number of parts, the improvement of the assembling, the reduction of manufacturing cost and the improvement of reliability of the device become realizable simultaneously.

BRIEF DESCRIPTION OF THE DRAWINGS

The above and other objects, features and advantages of the present invention will become apparent from the following detailed description when taken with the accompanying drawings, in which.

DETAILED DESCRIPTION OF THE PREFERRED EMBODIMENTS

In order to facilitate understanding of the present invention, a conventional coaxial repeater will be described first.

Figure 1:
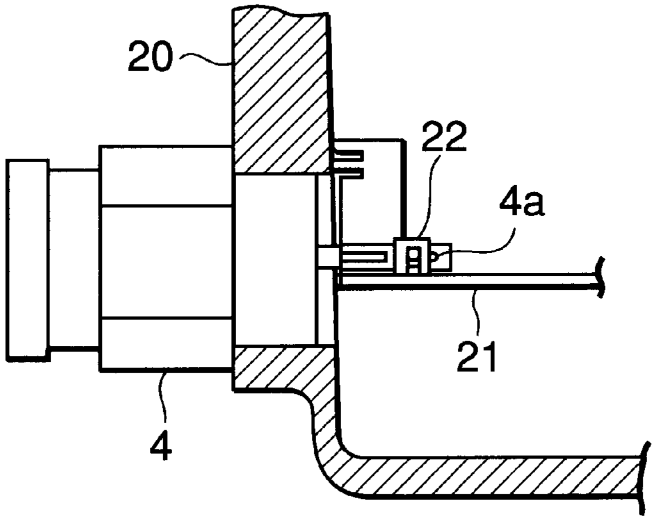
Fig.1 (PRIOR ART)
FIG. 1 is a cross section showing a construction of a conventional repeater.

In a structure of an input/output portion of a conventional repeater shown in FIG. 1, a signal is transmitted by fitting or soldering a center conductor 4*a* of an adapter 4 mounted on a casing 20 to a connecting metal ware 22 mounted on a printed circuit board 21. In another structure shown in FIG. 2, a center conductor 4*a* of an adapter 4 mounted on a casing 30 is passed through a connecting block 32 mounted on a printed circuit board 31 and is electrically connected to the block 32 by pressing the center conductor 4*a* to the block by a screw 33.

Figure 3:
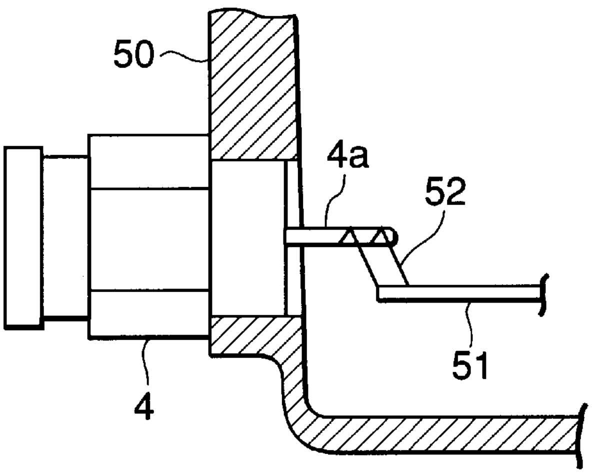
Fig.3 (PRIOR ART)
FIG. 3 is a cross section showing a further construction of a conventional repeater.
Figure 4:
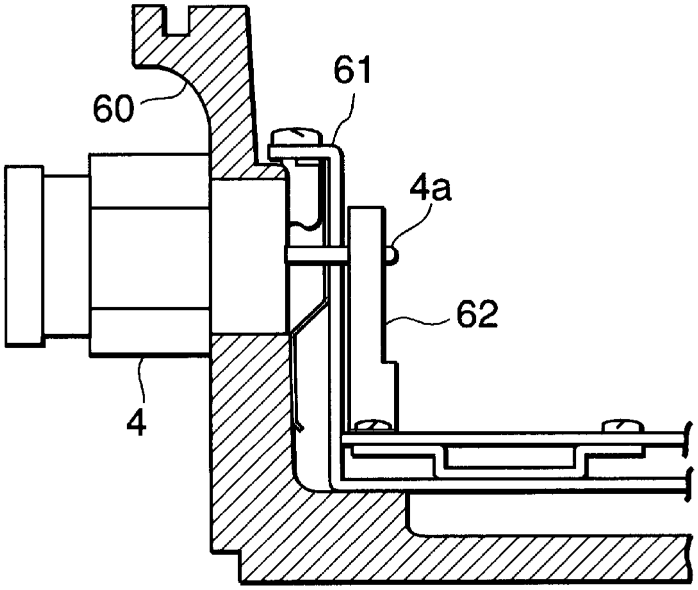
Fig.4 (PRIOR ART)
FIG. 4 is a cross section showing a still further construction of a conventional repeater.

In a further structure shown in FIG. 3, a signal is transmitted by connecting a metal wire material 52 to a center conductor 4*a* of an adapter 4 mounted on a casing 10 and connecting one end of the metal wire material 52 to a printed circuit board 51 mounted inside the casing.

Figure 6:
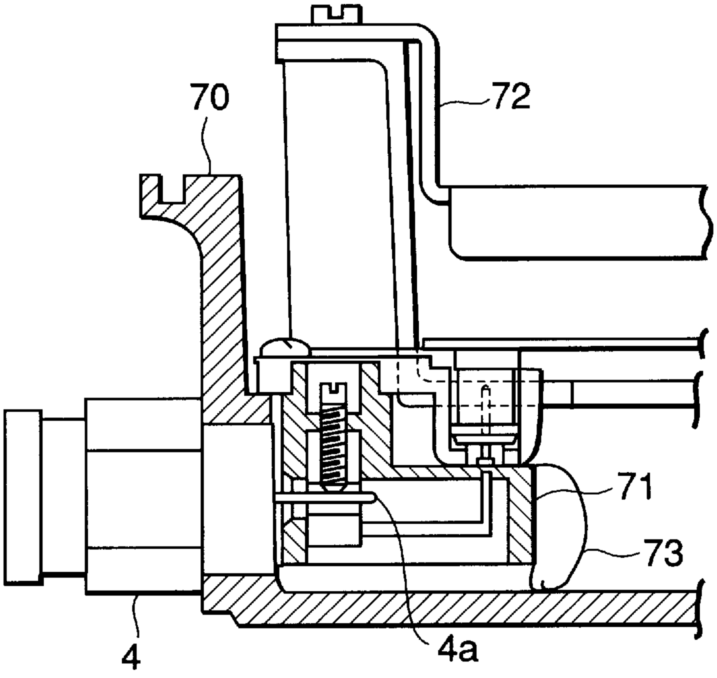
Fig.6 (PRIOR ART)
FIG. 6 is a cross section showing another construction of a conventional repeater.

In another structure shown in FIG. 6, a signal is transmitted by connecting a center conductor 4*a* of an adapter 4 mounted on a casing 60 to a hut shaped or U shaped connecting metal ware 62 mounted on an electronic device 61 mounted in the casing 60.

Figure 5:
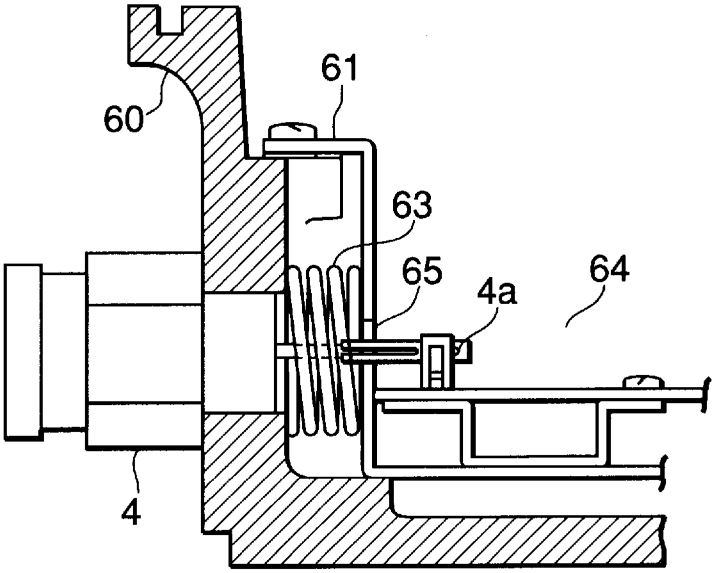
Fig.5 (PRIOR ART)
FIG. 5 is a cross section showing another construction of a conventional repeater.

Alternatively, in another structure of a conventional repeater shown in FIG. 5, a coil spring 63 is provided around a center conductor 4*a* of an adapter 4 mounted on a casing 60 and noise from an interior 64 of the casing 60 and from a through-hole 65 of an electronic device 61 mounted in the casing 60 is reduced by making a potential of the casing 60 closer to that of the electronic device 61 by a contact of the electronic device 61 with the coil spring 63.

Figure 2:
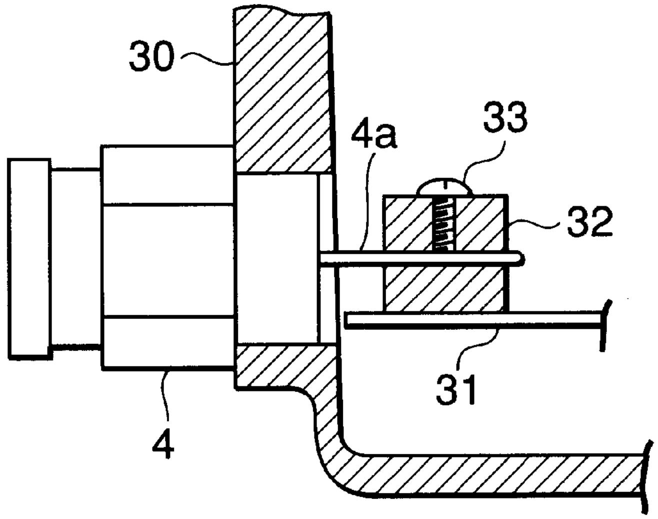
Fig.2 (PRIOR ART)
FIG. 2 is a cross section showing another construction of a conventional repeater.

In another structure of a conventional repeater shown in FIG. 6, an L shaped connecting metal ware 71 is added to a part corresponding to the block 32 shown in FIG. 2 to facilitate a detachable mounting of an electronic device 72. In this structure, a dead space, that is, a space in which no part can be mounted, in the repeater is increased due to the presence of the L shaped connecting metal ware 71. In such case, a grounding is facilitated by connecting the electronic device 72 to the casing 70 through a metal spring 73.

When the structures of the conventional input/output portion of the repeater mentioned above in which the center conductor of the adapter is fixed by using the block or the screw or it is connected by a point contact by means of the resilient connecting metal ware is used in a CATV coaxial repeater which uses a high frequency band (not lower than 450 MHz), the electrical characteristics (grounding characteristics, return-loss and undesired radiation, etc.) of the repeater is hardly maintained due to the small contact area and, in order to maintain the electrical characteristics stably, a special consideration (for example, a provision of a shield plate, a spring for making the grounding reliable and/or a shield plate, etc.) for maintaining the electrical characteristics is required, which causes an assembling to be complicated and a cost to be increased, as mentioned previously.

When the center conductor of the adapter is connected to the block or the connector and then to the internal electronic device through the printed circuit board, the signal is transmitted through a plurality of connecting portions. Therefore, there may be signal loss (return-loss, ground potential) between the connecting portions. In such case, the signal flowing between the printed boards is influenced by undesired radiation produced within the device and noise may be introduced to the signal, leading to a degradation of the electrical characteristics of the device.

Further, since, for the higher the frequency band of an external signal, it is important in improving the electrical characteristics to transmit the signal through a physically shorter distance, a circuit line itself of the printed circuit board becomes a capacitor and/or a coil in the input/output portion in which a signal is transmitted through the printed circuit board to the amplifier portion. Therefore, there may be an impedance mismatching with which there may be a difference in ground potential within the repeater, causing degradation of the electrical characteristics thereof.

In the structure in which the coil spring is provided around the center conductor of the adapter and is made in contact with the internal electronic device to thereby improve the grounding system, it is impossible, in view of replacement and/or maintenance of the electronic device, to easily mount/demount the electronic device even when there is a problem in the electronic device. Therefore, the replacement of electronic device becomes impossible and there is a problem in view of maintenance.

In the structure in which the grounding is improved by shielding the connecting metal ware connecting between the center conductor of the adapter and the electronic device by using a plate, a grounding plate or a guide, etc., the internal construction becomes complicated and there may be a possibility of degradation of electric characteristics due to secular variation of the grounding characteristics of the spring contact, so that the reliability is low. Further, this structure is complicated and the assembling thereof is difficult, so that the number of parts is increased and the cost becomes high.

Now, an embodiment of the present invention will be described in detail with reference to FIGS. 7A to 13B.

Figure 7A:
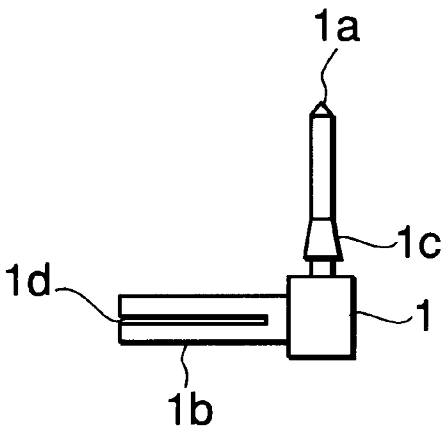
FIG. 7A shows an L shaped metal piece 1 constituting a connector.
Figure 7B:
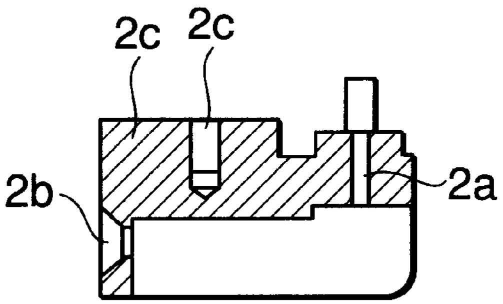
FIG. 7B shows an insulating casing 2 constituting the connector.

Referring to FIG. 7A, a connector according to an embodiment of the present invention is constituted with an L shaped metal piece 1 and an insulating casing 2 (FIG. 7B). The L shaped metal piece 1 includes a protruded portion 1*a* which is a connecting piece for an electrical connection to an amplifier portion 8 and a protruded portion 1*b* which is a connecting piece for an electric connection to a center conductor 4*a* of an adapter 4. The protruded portions 1*a* and 1*b* are perpendicular to each other to form the L shape. A portion 1*c* of the protruded portion 1*a* is tapered to prevent the protruded portion 1*a* pressure-inserted into the insulating casing 2 from dropping out and the protruded portion 1*b* is formed with a slit 1*d* for engagement with the center conductor 4*a* of the adapter 4. Incidentally, the L shaped metal piece 1 is of copper or phosphor bronze which has good resiliency and electrical conductivity, with or without plating.

In FIG. 7B, the insulating casing 2 is formed with a fitting hole 2*a* for receiving the protruded portion 1*a* of the L shaped metal piece 1, a tapered hole 2*b* for introducing the center conductor 4*a* of the adapted 4 to an interior of the casing 2, a tapped hole 2*c* for fixing the insulating casing within an introducing hole 3*a* of a casing 3 and a protrusion 2*d* for positioning the insulating casing 2 within the introducing hole 3*a* of the casing 3. The insulating casing 2 is preferably of foamed polyethylene featured by low dielectric constant and low loss characteristics at high frequency and an outer configuration of the insulating casing 2, particularly, a wall thickness thereof may be determined according to a frequency band to be used.

Figure 7C:
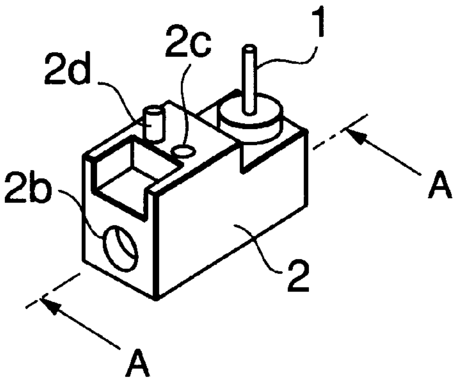
FIG. 7C is a perspective view of a connector according to an embodiment of the present invention.
Figure 7D:
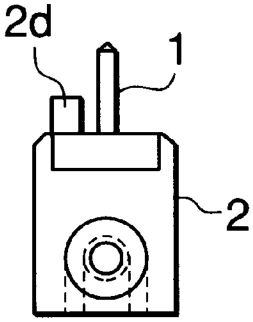
FIG. 7D is a front view of the connector according to the embodiment of the present invention.
Figure 7E:
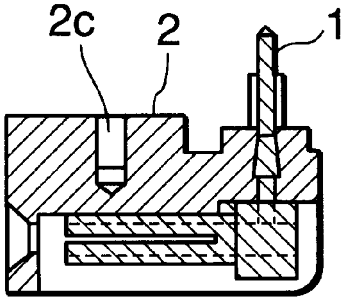
FIG. 7E is a cross section taken along a line A—A in FIG. 7C.

Referring to FIGS. 7C to 7E, the connector is formed by pressure-inserting the protruded portion 1*a* of the L shaped metal piece 1 into the fitting hole 2*a* of the insulating casing 2 and fitting the L shaped metal piece 1 to the insulating casing 2. In this case, since a diameter of the tapered portion 1*c* of the protruded portion 1*a* is larger than an inner diameter of the fitting hole 2*a,* the L shaped metal piece 1 is prevented from dropping out from the insulating casing 2.

Figure 8:
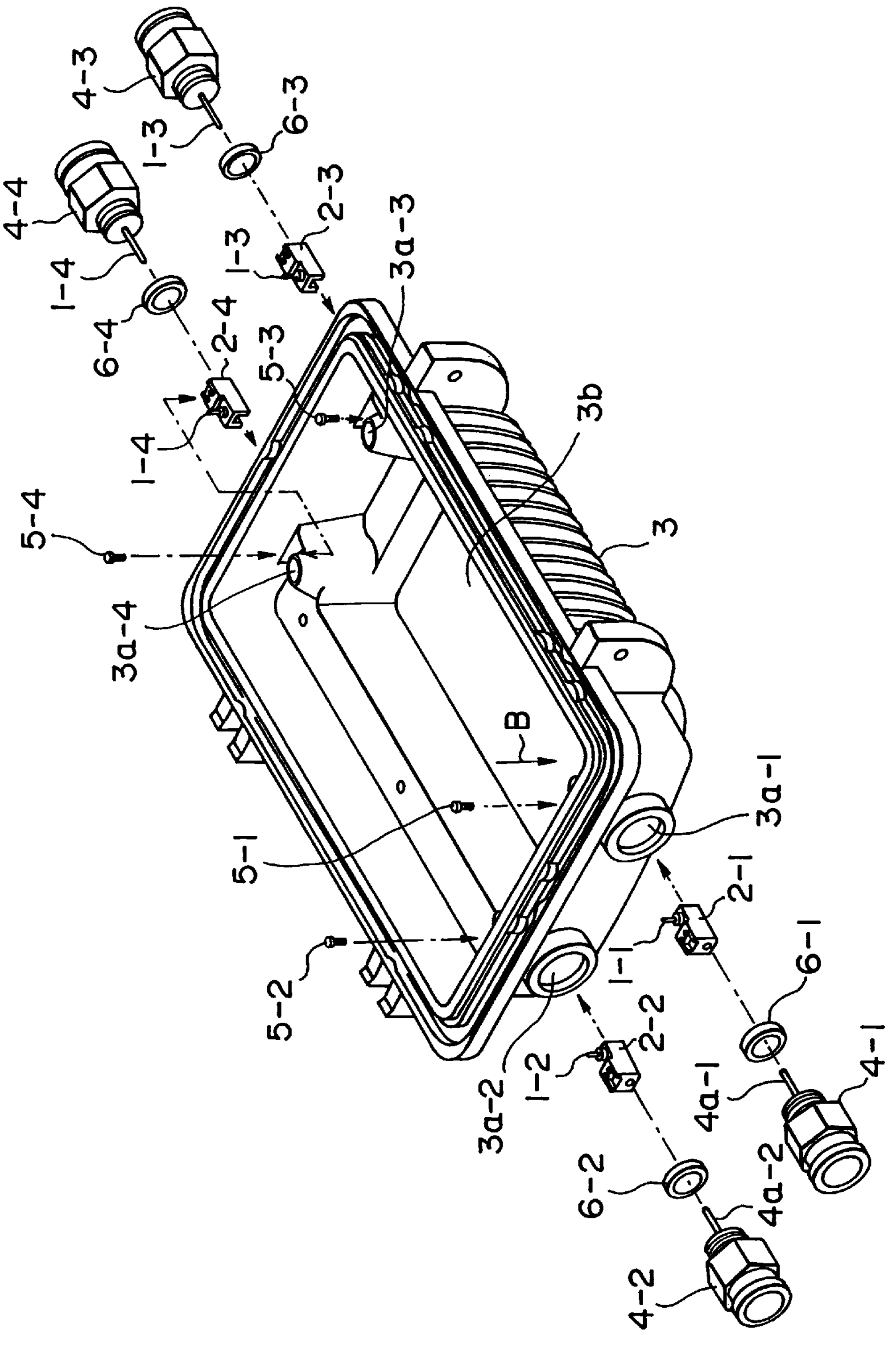
FIG. 8 shows the connector shown in FIG. 7 in a mounted state.
Figure 9:
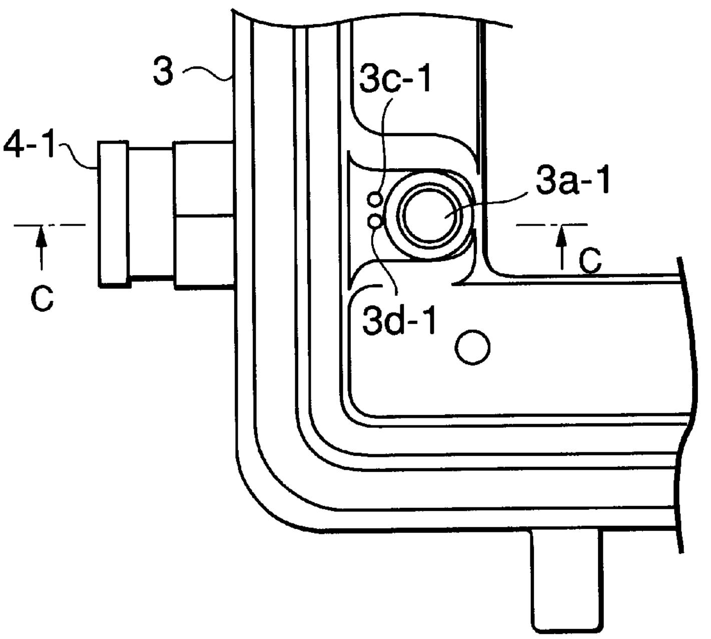
FIG. 9 shows a portion of the connector shown by an arrow B in FIG. 8 in an enlarged scale.
Figure 10:
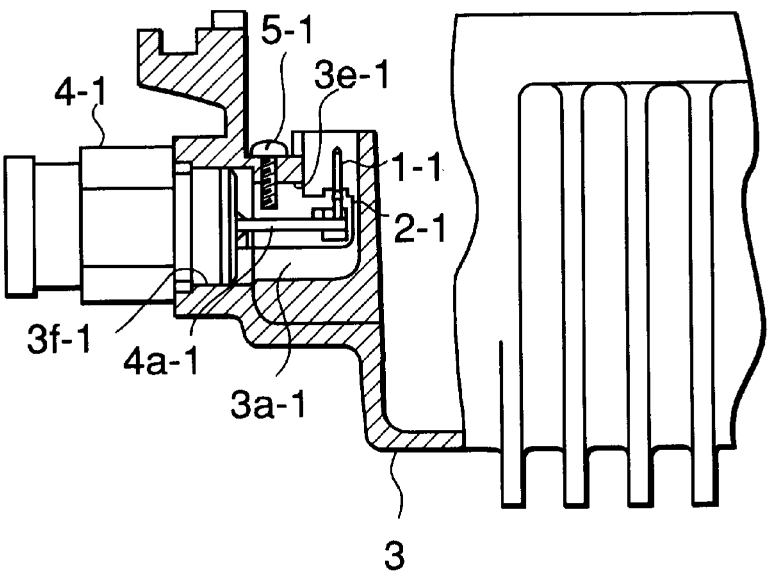
FIG. 10 is a cross section taken along a line C—C in FIG. 9.

Referring to FIG. 8, the casing 3 is formed with introducing holes 3*a*-1 to 3*a*-4 for receiving adapters 4-1 to 4-4 for receiving external signals and transmitting signals. Connectors for connecting the adapters 4-1 to 4-4 to connecting portions 4*a*-1 to 4*a*-4 (the connecting portions 4*a*-2 to 4*a*-4 are not shown) included in the amplifier portion 8 are mounted in the respective introducing holes 3*a*-1 to 3*a*-4.

Figure 13A:
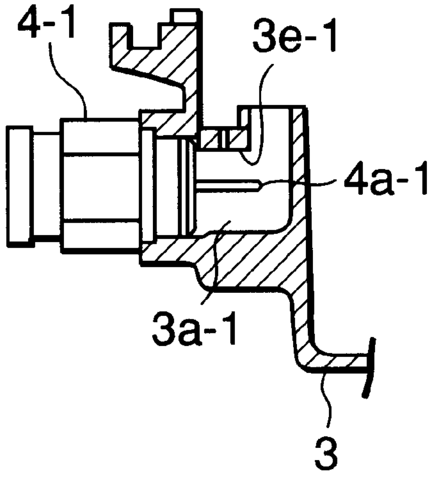
FIG. 13A shows a mounting state of an adapter 4-1 shown in FIG. 8 on the casing 3.
Figure 13B:
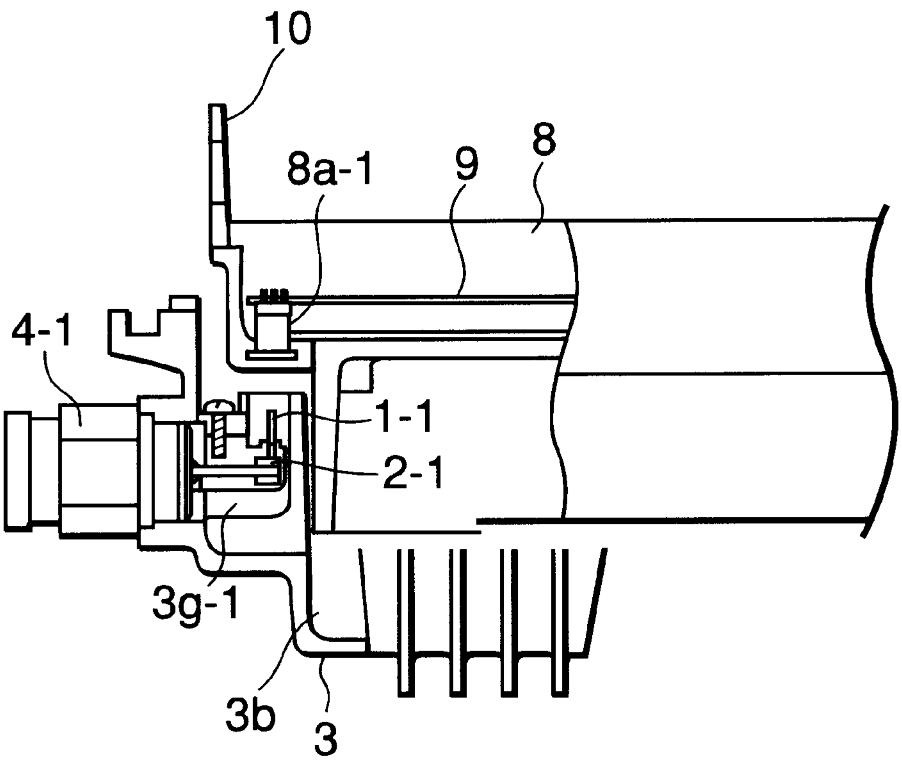
FIG. 13B shows a mounting of the amplifier portion 8 shown in FIG. 11 on the casing 3.

In FIG. 13B, when the detachable amplifier portions 8 are fitted in the introducing holes 3*a*-1 to 3*a*-4 provided in the casing 3, spaces 3*g*-1 to 3*g*-4 (the spaces 3*g*-2 to 3*g*-4 are not shown) surrounding the connectors are formed in the respective introducing holes 3*a*-1 to 3*a*-4, respectively. The spaces 3*g*-1 to 3*g*-4 are shielded with respect to the receiving space 3*b* of the casing 3 and are realized by considering the design and fabrication of the casing 3.

Referring to FIGS. 9, 10, 13A and 13B, positioning holes 3*c*-1 to 3*c*-4 (the positioning spaces 3*c*-2 to 3*c*-4 are not shown) in which the positioning protrusions 2*d* of the insulating casing 2, fixing tap holes 3*d*-1 to 3*d*-4 provided in positions corresponding to the fixing taps 2*c* of the insulating casing 2 (the fixing tap holes 3*d*-2 to 3*d*-4 are not shown), flat planes 3*e*-1 to 3*e*-4 for providing a parallelism of the connectors (the flat planes 3*e*-2 to 3*e*-4 are not shown) and tap holes 3*f*-1 to 3*f*-4 for fixing the adapters 4-1 to 4-4 (the tap holes 3*f*-2 to 3*f*-4 are not shown) are provided in the spaces 3*g*-1 to 3*g*-4 of the introducing holes 3*a*-1 to 3*a*-4, respectively.

The casing 3 is equipped with a rotary door 7 and the CATV coaxial repeater according to the embodiment of the present invention (refer to FIGS. 11 and 12) is realized by receiving the amplifier portion 8 in the receiving space 3*b* of the casing 3 by opening the door 7 and then covering the opening portion of the casing 3 by closing the door 7. In this case, the connecting portion of the coaxial cable which is not shown is ready to be connected to the adapters 4-1 to 4-4 and an amplifier (not shown) for amplifying the external signal and an internal circuit (not shown) are provided in the amplifier portion 8.

The casing 3 is preferably provided by molding of a moldable material such as aluminum, zinc, magnesium, stainless steal or any alloy thereof.

The amplifier portion 8 is constructed with a printed circuit board 9 and a frame 10. In fitting the amplifier portion 8 to the casing 3, connecting portions 8*a* mounted on the printed circuit board 9 mounted on the frame 10 of the amplifier portion 8 are connected to the connectors mounted on the casing 3. The amplifier and the internal circuit are mounted on the printed circuit board 9.

An assembling of the CATV coaxial repeater according to the embodiment of the present invention will be described. First, the connector is assembled by pressure-inserting the protruded portions 1*a* of the L shaped metal pieces 1, which have the taper portions 1*c,* into the respective fitting holes 2*a* of the insulating casing 2 (see FIG. 7E).

The connectors thus assembled are mounted in the introducing holes 3*a*-1 to 3*a*-4 of the casing 3. That is, the connectors are mounted in the introducing holes 3*a*-1 to 3*a*-4 by fitting the positioning protrusions 2*d* of the insulating casing 2 in the positioning holes 3*c*-1 to 3*c*-4 in the introducing holes 3*a*-1 to 3*a*-4 and screwing the screws 5-1 to 5-4 screwed in the fixing tap holes 3*d*-1 to 3*d*-4 into the fixing tap holes 2*c* of the insulating casing 2, respectively (see FIGS. 8 to 10). The connectors are held in parallel to each other by the flat planes 3*e*-1 to 3*e*-4 in the introducing holes 3*a*-1 to 3*a*-4 by tightly screwing the screws 5-1 to 5-4 to the fixing holes 2*c,* respectively.

The adapters 4-1 to 4-4 are mounted through washers 6-1 to 6-4 to the respective introducing holes 3*a*-1 to 3*a*-4 in which the connectors are mounted. Since, in this case, the connecting portions of the adapters 4-1 to 4-4 are formed with threaded portions, respectively, the center conductors 4*a*-1 to 4*a*-4 of the adapters 4-1 to 4-4 are guided into the protruded portions 1*b* of the L shaped metal pieces 1 by the tapered holes 2*b* of the insulating casing 2 and fixedly fitted to the protruded portions 1*b* forms with the slits 1*d* by screwing the threaded portions into the tap holes 3*f*-1 to 3*f*-4 of the introducing holes 3*a*-1 to 3*a*-4, respectively (FIGS. 8 to 10, 13A and 13B).

Figure 11:
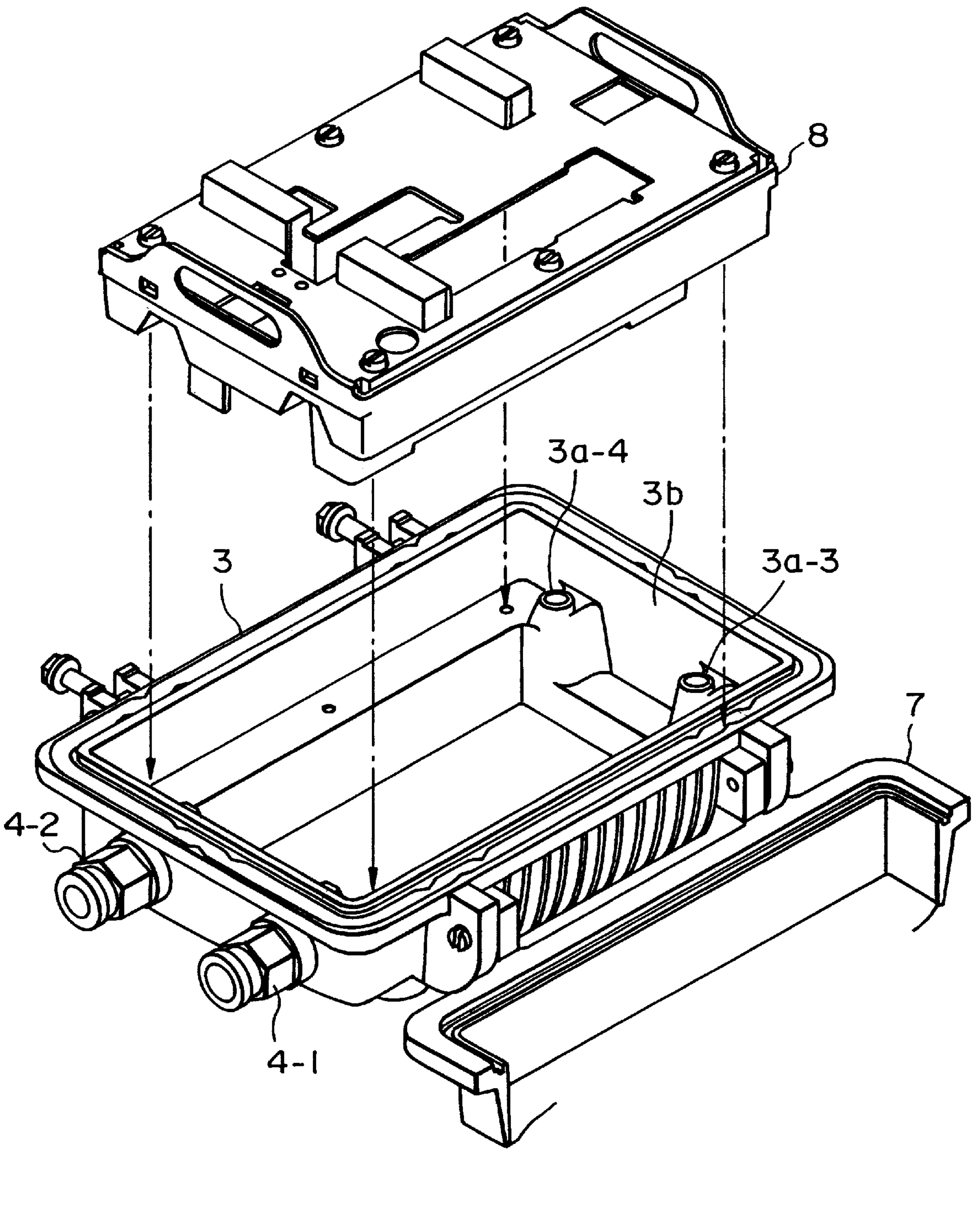
FIG. 11 shows a mounting of an amplifier portion on a casing 3 on which a connector according to an embodiment of the present invention.
Figure 12:
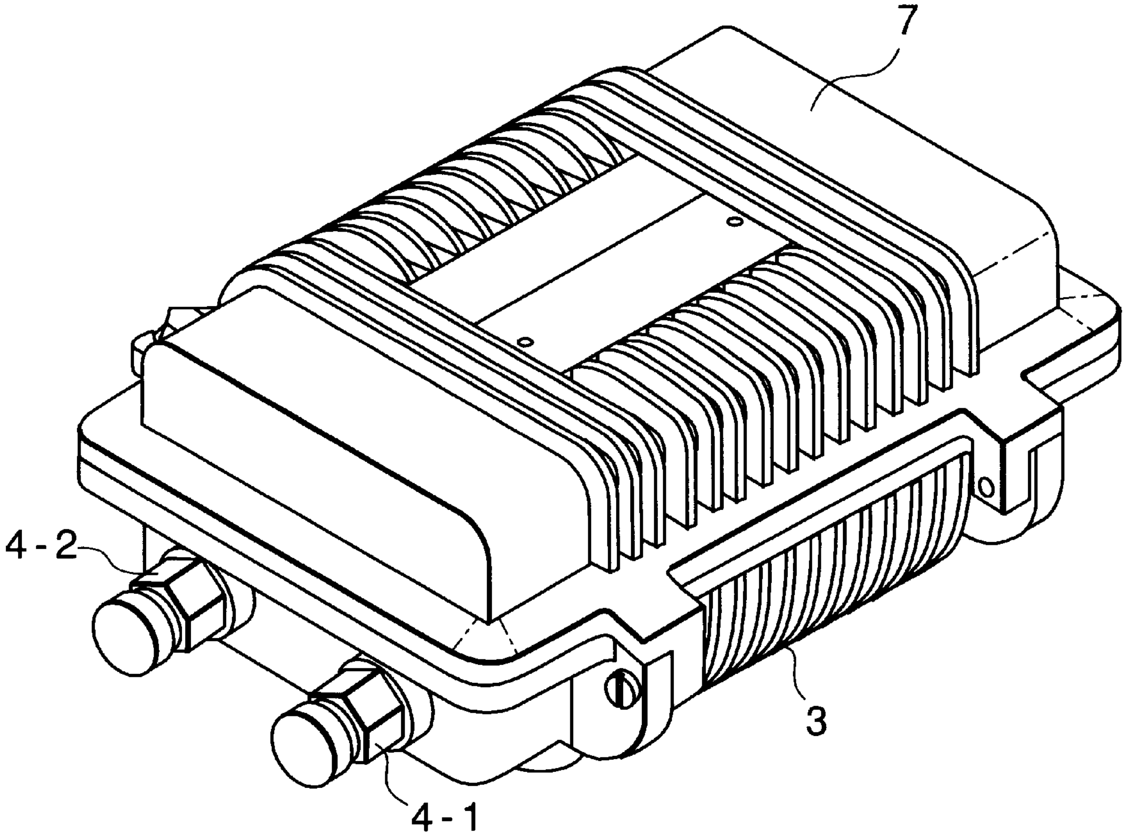
FIG. 12 shows an assembled state of the connector shown in FIG. 11 on the casing 3.

Thereafter, the amplifier portion 8 is received in the receiving space 3*b* while fitting the connecting portions 8*a* of the amplifier portion 8 on the protruded portions 1*a* of the L shaped metal pieces 1 in the introducing holes 3*a*-1 to 3*a*-4, respectively (see FIGS. 11 and 13). Since the opening portions of the introducing holes 3*a*-1 to 3*a*-4 are thus closed by the adapters 4-1 to 4-4, the spaces 3*g*-1 to 3*g*-4 shielded from the receiving spaces 3*b* are formed in the portions of the introducing holes 3*a*-1 to 3*a*-4, that is, the portions in which the connectors are mounted (see FIG. 13B). The assembling of the CATV coaxial repeater according to the present invention is completed by closing the opening portion of the casing 3 by the door 7 in this state.

The shielded spaces, that is, the spaces 3*g*-1 to 3*g*-4, can shield noise radiated from the amplifier portion 8 and the grounding thereof is stable. Therefore, it is possible to exclude the causes (noise, etc., radiated within the repeater) of signal degradation for high frequency signal input from the adapters 4-1 to 4-4 and to transmit the externally input signal to the amplifier portion 8 with a minimum time delay without signal degradation.

Therefore, with the above described connecting structure, it is possible to substantially reduce the signal degradation in the connecting portion of a device operating at high frequency band and to stably receive and transmit the substantially noiseless signal by the present coaxial repeater. Further, since the number of constructive parts is reduced, it is possible to improve the assembling operation, reduce the cost of parts and provide the stabilized quality.

As described, it is possible to shield noise radiated from the amplifier portion 8 and stabilize the grounding of the amplifier portion 8 by providing the spaces 3*g*-1 to 3*g*-4 shielded from the receiving spaces 3*b* in the introducing holes 3*a*-1 to 3*a*-4 by mounting the connectors each composed of the L shaped metal piece 1 and the insulating casing 2 in the introducing holes 3*a*-1 to 3*a*-4 of the casing 3 and detachably mounting the adapters 4-1 to 4-4 and the amplifier portion 8 to the connectors. Therefore, it is possible to exclude the causes (noise, etc., radiated within the repeater) of signal degradation for high frequency signal input from the adapters 4-1 to 4-4 and to transmit the externally input signal to the amplifier portion 8 with a minimum time delay without signal degradation.

Since it is possible to shield the externally supplied high frequency signal from noise generated within the device, the stable quality signal connection becomes possible with minimum influence of noise.

Further, by forming the introducing holes 3*a*-1 to 3*a*-4 in which the spaces 3*g*-1 to 3*g*-4 for shielding the connectors from the receiving spaces 3*b* in the casing 3 during the fabrication (molding) of the casing 3, the casing 3 itself can stabilize the grounding potential and function as the shield plate and the shield cover for radiated noise shielding. Further, the connector can be realized by only two parts, that is, the L shaped metal piece 1 and the insulating casing 2, it is possible to realize an easily assembled and inexpensive connecting structure.

What is claimed is:

1. A coaxial repeater comprising:

an amplifier for amplifying an external signal input through a coaxial cable and supplying the amplified external signal to an internal circuit;

an adapter including a center conductor fitted with a connecting portion of said coaxial cable and electrically connected to said connecting portion of said coaxial cable;

a connector having a first connecting piece for mechanically holding said center conductor and electrically connecting said center conductor and a second connecting piece extending perpendicularly to said first connecting piece and electrically connected to a connecting portion of said amplifier;

a main body including a receiving space for receiving said amplifier and a space for receiving said connector, said space being shielded from said receiving space with said amplifier and said adapter being mounted; and a door covering an opening portion of said main body, said adapter and said amplifier being detachably mounted to said connector.

2. A coaxial repeater as claimed in claim 1, wherein said main body and said door are molded out of electrically conductive material, respectively.

3. A coaxial repeater as claimed in claim 1, wherein said connector includes an insulating casing member for holding said first and second connecting pieces in said space, said insulating casing member being fixed within said space.

4. A coaxial repeater as claimed in claim 3, wherein said insulating casing member is formed with a fitting hole for fittingly holding said second connecting piece, a tapered hole for receiving said center conductor and positioning protrusions for fixedly securing said insulating casing member in a predetermined position within said space.

5. A coaxial repeater comprising:

an amplifier for amplifying an external signal input through a first coaxial cable and supplying the amplified external signal to an internal circuit;

a first adapter including a first center conductor fitted in a connecting portion of said first coaxial cable and electrically connected to said connecting portion of said first coaxial cable;

a second adapter including a second center conductor fitted in a connecting portion of a second coaxial cable to which an output signal of said internal circuit is output and electrically connected to said connecting portion of said second coaxial cable;

a first connector having a first connecting piece for mechanically holding said first center conductor and electrically connecting said first center conductor and a second connecting piece extending perpendicularly to said first connecting piece and electrically connected to a connecting portion of said amplifier;

a second connector having a third connecting piece for mechanically holding said second center conductor and electrically connecting said second center conductor and a fourth connecting piece extending perpendicularly to said third connecting piece and electrically connected to a connecting portion of said internal circuit;

a main body including a receiving space for receiving said amplifier and a first and second spaces for receiving said first and second connectors, respectively, said first and second spaces being shielded from said receiving space with said amplifier and said first and second adapters being mounted; and a door covering an opening portion of said main body, said first and second adapters, said amplifier and said internal circuit being detachably mounted to said first and second connectors.

6. A coaxial repeater as claimed in claim 5, wherein said main body and said door are molded out of electrically conductive material, respectively.

7. A coaxial repeater as claimed in claim 5, wherein said first connector includes a first insulating casing member for holding said first and second connecting pieces in said first space, said insulating casing member being fixed within said first space, and said second connector includes a second insulating casing member for holding said third and fourth connecting pieces in said second space, said second insulating casing member being fixed within said second space.

8. A coaxial repeater as claimed in claim 7, wherein said first and second insulating casing members are formed with fitting holes for fittingly holding said second and fourth connecting pieces, tapered holes for receiving said first and second center conductors and positioning protrusions for fixedly securing said first and second insulating casing members in predetermined positions within said first and second spaces, respectively.

* * * * *